March 21, 1961 A. H. MACISZEWSKI ET AL 2,976,494

CALIBRATING MEANS FOR A VARIABLE FREQUENCY OSCILLATOR

Original Filed May 13, 1954 2 Sheets-Sheet 1

Inventors
Arthur H. Maciszewski
Julius J. Hupert
Richard Goldstein
Tadeusz Szubski
by Smith, Langley, Baird & Clayton Attys.

March 21, 1961 A. H. MACISZEWSKI ET AL 2,976,494

CALIBRATING MEANS FOR A VARIABLE FREQUENCY OSCILLATOR

Original Filed May 13, 1954 2 Sheets-Sheet 2

Inventors
Arthur H. Maciszewski
Julius J. Hupert
Richard Goldstein
Tadeusz Szubski
by Smith, Olsen, Baird & Clayton Attys.

United States Patent Office 2,976,494
Patented Mar. 21, 1961

2,976,494

CALIBRATING MEANS FOR A VARIABLE FREQUENCY OSCILLATOR

Arthur H. Maciszewski, Julius J. Hupert, Richard Goldstein, and Tadeusz Szubski, all of River Forest, Ill., assignors to A.R.F. Products, Inc., River Forest, Ill., a corporation of Illinois Original application May 13, 1954, Ser. No. 429,547, now Patent No. 2,881,315, dated Apr. 7, 1959. Divided and this application Apr. 21, 1958, Ser. No. 729,742

6 Claims. (Cl. 331—44)

This invention relates to signal generators and circuits therefor and particularly to calibrated signal generators and circuits therefor useful in testing electronic equipment.

The apparatus of the present invention includes a radio frequency oscillator whose frequency is continuously variable over a definite range of finite extent. The frequency of this oscillator, which can be called the variable oscillator, is checked and calibrated against the output of a calibration oscillator. The calibration oscillator operates at a fixed predetermined frequency huch for example as two megacycles. The output of the calibration oscillator is amplified in such a manner as to generate harmonics of the fundamental frequency of the calibration oscillator so that calibrated signals can be obtained at regular intervals throughout the frequency range of the variable oscillator.

In commercial devices it is desirable to have calibration signals available at one megacycle interval at least in the lower half of the frequency range of the variable oscillator. Greater stability and accuracy of the calibration signals are obtained if the fundamental frequency of the calibration oscillator is some multiple of one megacycle.

Accordingly, it is an important object of the present invention to provide a system wherein, for example, one megacycle calibration signals can be produced when, for example, two megacycle fundamental reference frequency is generated by the calibration oscillator whereby a smaller number of harmonics of the fundamental reference frequency may be used to achieve a given range of calibration.

In connection with the foregoing object it is still another object to provide a system of the type set forth in which calibration signals are obtained at one megacycle intervals in the lower half of the predetermined frequency range of the variable oscillator and the space between calibration signals in the upper half of the range of the variable oscillator is two megacycles thereby giving a greater spread between the calibration signals at the upper end of the frequency spectrum where small movements of the calibrating dials effect relatively large changes in frequency.

These and other objects and advantages of the invention are achieved by the signal generator illustrated in the accompanying drawings. In the drawings wherein like reference numerals have been used to designate like parts throughout:

Figure 5:
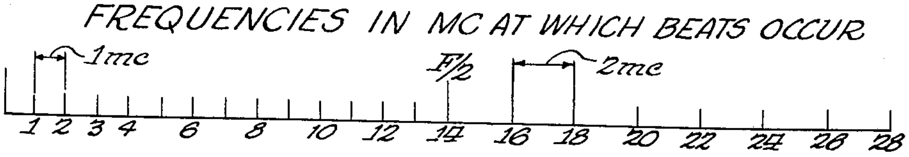
Figure 6:
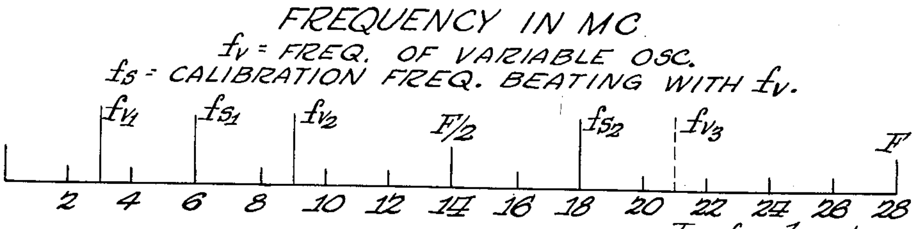

Fig. 5 is a chart illustrating the frequencies at which calibration beat nulls are obtained within the frequency range of the variable oscillator when the output of the variable oscillator is beat against the output of the harmonic amplifier of the calibrated oscillator; and Fig. 6 is a chart illustrating the manner in which calibrated beat nulls are obtained at odd megacycle positions in the lower half of the frequency range of the variable oscillator and why no calibarted beat nulls are obtained in the upper half of the range of the variable radio frequency oscillator.

Figures 1, 2:
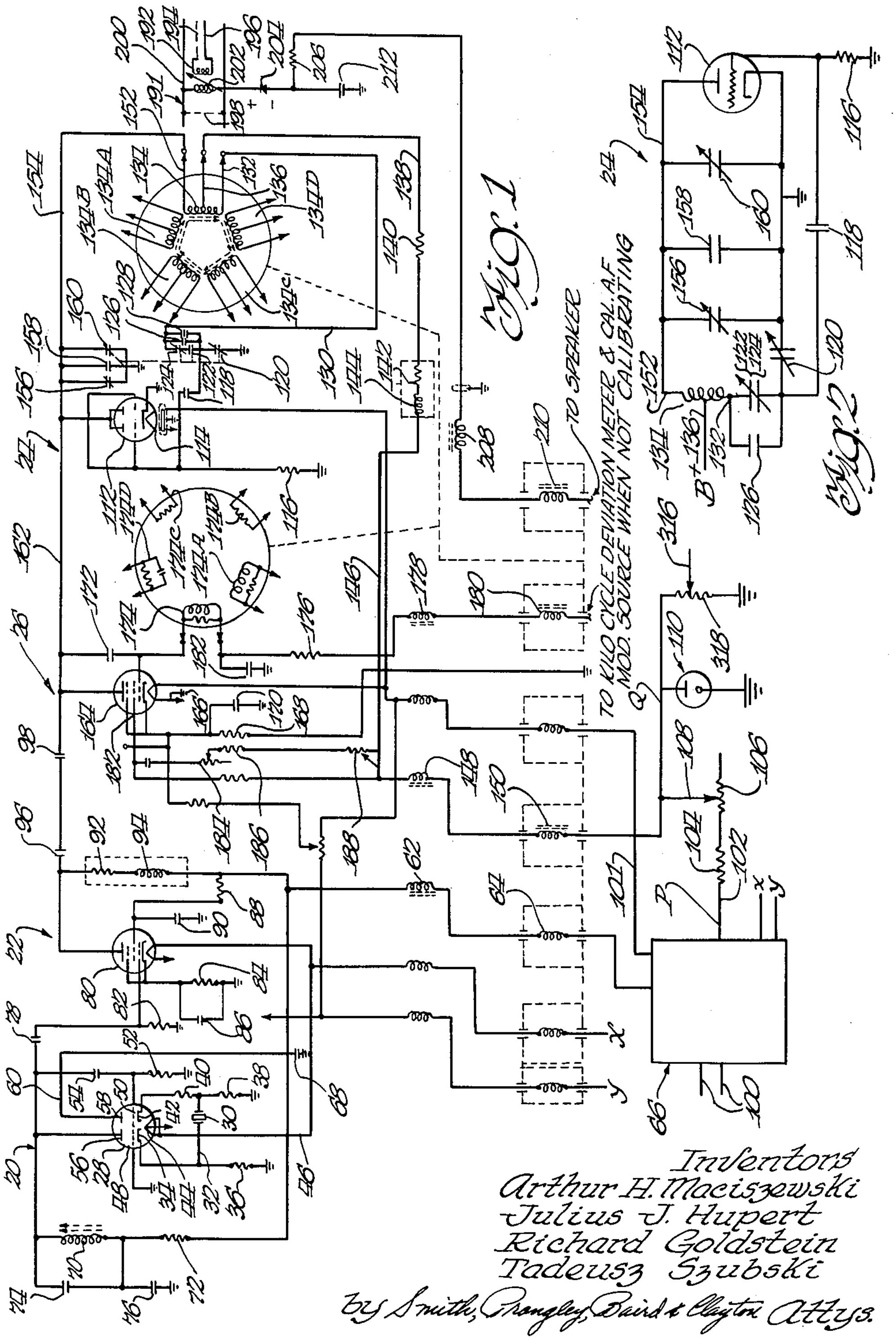
Fig. 1 is a circuit diagram, part diagrammatic, of the variable radio frequency oscillator of this invention and its connection with the reactor tube, the calibration oscillator, and the radio frequency output attenuator.
Fig. 2 is a simplified circuit diagram of the temperature compensating circuit for stabilizing the frequency of the variable radio frequency oscillator.

Referring now to the drawings and particularly to Fig. 1 there is shown the calibrated radio frequency section of the signal generator made according to and incorporating the principles of the present invention. The calibrated radio frequency section of the signal generator comprises generally a calibrating oscillator 20, a harmonic generator and amplifier 22, a variable radio frequency oscillator 24 and a modulating or reactor tube circuit 26. In general the purpose of the calibrating oscillator 20 is to generate an accurate radio frequency operating at a given fundamental frequency such as, for example, two megacycles, this frequency being calibrated and controlled to a high degree of accuracy. The output of the calibrating oscillator 20 is then fed to the harmonic generator and amplifier 22 which generates harmonics of the fundamental frequency of two megacycles and amplifiers these harmonic frequencies as well as the fundamental frequency to provide calibrating reference signals.

The oscillator 24 is continually variable over a specified range and as illustrated has five separate ranges over which the frequency is continually variable. It is oscillator 24 which will provide the working signal to be used in testing and calibrating other electronic equipment. The output of the variable radio frequency oscillator 24 and the output of the harmonic amplifier 22 are each fed to the reactor tube circuit 26 and there beat against each other. The output of the reactor tube circuit 26 is fed to a deviation meter or to a speaker so that the difference between the variable oscillator frequency and the appropriate calibrating signal can be detected and adjusted to zero at which time the frequency of the variable oscillator 24 can be said to be calibrated.

Each element of the above radio frequency generating and calibrating circuit will now be discussed in detail.

Referring first to the calibrating oscillator 20, this oscillator includes a duo-triode 28 whose operation is controlled by a crystal 30. Although any suitable frequency of crystal 30 may be utilized, a crystal operating at a frequency of two megacycles is preferred. A crystal operating at two megacycles permits one megacycle beat nulls to be generated with the use of a minimum of harmonics of the fundamental operating frequency of crystal 30 as will be explained in full hereinafter. One of the terminals of crystal 30 is connected through a lead 32 to one of the cathodes 34 of tube 28 which is preferably a type 12AU7, and through a resistor 36 (820 ohms) to ground. The other terminal of crystal 30 is connected through a resistor 38 (820 ohms) to ground and through a resistor 40 (820 ohms) to the other cathode 42 of tube 28. The cathodes 34 and 42 are heated by heaters 44 that are supplied with suitable power through line 46. One of the control grids 48 is grounded and the other control grid 50 is connected through a resistor 52 (4700 ohms) to ground and through a capacitor 54 (470 μμf.) to one of the plates 56 of tube 28. The other plate 58 of tube 28 is connected through a line 60, an inductance 62 (0.9 μh.) and a shielded inductance 64 (0.9 μh.) to a source 66 of high operating potential. A capacitor 68 (5000 μμf.) is connected from plate 58 to ground to filter out and prevent radio frequency oscillations from entering the power supply 66. Plate 56 is connected through a variable inductance 70 and a resistor 72 (1000 ohms) to line 60 whereby to provide a source of high operating potential for plate 56. There is provided in parallel with inductor 70 a capacitor 74 (150 μμf.) and the junction between inductance 70 and resistor 72 is connected to ground by another capacitor 76 (5000 μμf.).

The above described circuit operates as a radio frequency oscillator at two megacycles when inductor 70 is properly adjusted to produce a resonant circuit at two megacycles.

The output from the calibration oscillator 20 is fed through a coupling capacitor 78 (470 μμf.) from plate 56 to the first grid of a tube 80 which serves as the harmonic generator and amplifier for circuit 22. Tube 80 is preferably a pentode and may be for example a 6AH6 or any other pentode having similar characteristics. The input signal on the control grid of tube 80 is developed across resistor 82 connected from the grid to ground, this resistor having a value of 47000 ohms. The third or suppressor grid of tube 80 is connected directly to the cathode and the cathode is provided with self bias through a resistor 84 (220 ohms) which is connected to ground and which has in parallel therewith a capacitor 86 (5000 μμf.). The second or screen grid is connected through a resistor 88 (47000 ohms) to a source of operating potential through inductors 62 and 64 and is by-passed to ground by a capacitor 90 (5000 μμf.). The plate of tube 80 is connected through a resistor 92 in series with an inductor 94 which in turn is connected to a source of operating potential through an inductance 62 and 64. Resistor 92 preferably has a value of 400 ohms and inductor 94 is so chosen that the amplifier 92 has a by-pass from two megacycles to and through 28 megacycles but has a relatively sharp cut-off between 28 megacycles and 30 megacycles. This is assuming that the operating range of the variable frequency oscillator 24 is to be in the range from zero megacycles up to and including 28 megacycles. If the range of the variable frequency oscillator 26 is to be greater or less, the values of resistor 92 and inductor 94 are chosen accordingly. The sharp cut-off characteristics of these circuit elements serve a purpose which will be more fully described later in this specification when discussing the calibration of oscillator 24.

The output from amplifier 22 will consist of an accurately controlled signal at two megacycles and the harmonics thereof up to and through the 14th harmonic which corresponds to 28 megacycles. The 15th harmonic and higher harmonics will be suppressed for reasons which will be more apparent hereinafter. The output of the amplifier 22 is fed through a pair of series coupling capacitors 96 (10 μμf.) and 98 (1 μμf.) to the plate of the tube in reactor circuit 26.

All of the operating potential for the tubes 28 and 80 and for the tubes in the oscillator circuit 24 and the reactor circuit 26 are supplied from the power supply or source generally designated by the numeral 66. The power supplied to power supply 66 is the usual 110 volts 60 cycle A.C. current which is supplied through a pair of lines 100 which will be hereafter referred to as the main supply line. The power supply 66, which is illustrated diagrammatically in Fig. 1, includes suitable transformers and rectifiers. One of the outputs of the power supply 66 is a non-regulated 6.3 volt heater supply, the terminals of which are indicated by the numerals "X" and "Y" and are the source of current for the cathode heaters described above. The inductor 64 is connected to an unregulated voltage point within power supply 66 for supplying relatively high operating potentials to the plates and grids of tubes 28 and 80. Another output from power supply 66 is a 6.7 volt heater supply 101 which is used to heat the filaments of the tubes in oscillator circuit 24 and reactor circuit 26.

One of the principal outputs of power supply 66 is an unregulated voltage appearing on line 102. Line 102 is connected to a resistor 104 (1600 ohms) which is in turn connected to a variable resistance 106 (1000 ohms). The movable arm 108 on the variable resistance 106 is connected to the plate of a voltage regulator tube 110 which may be of the type designated 0A2. The voltage appearing on arm 108 serves as a regulated voltage supply for use on certain of the grids and the plates in the tubes of circuits 24 and 26.

The variable radio frequency oscillator 24 utilizes a duo-triode 112 which may be of the type designated 6J6. The cathode of tube 112 is heated by a filament 114 which is supplied with power from the low voltage supply 101. The cathode is grounded; the two control grids are connected to each other and the two plates are connected to each other. The grids are also connected to ground through a resistor 116 (33000 ohms) and to a capacitor network which forms one of the tuning elements of the oscillator tank. More specifically, the grids are connected to a capacitor 118 (82 μμf.) which is in turn connected to a grounded variable capacitor 120 (12.4–77.6 μμf.), to a pair of variable capacitors 122 and 124 (having a combined capacitance of 8.0 to 66.8 μμf.), a capacitor 126 (2.1 μμf.) in parallel with capacitors 122 and 124 ,and a two section capacitor 128 (2.1 to 5.3 μμf. per section) which is in parallel with capacitor 126. The upper ends of capacitors 124 and 126 and 128 are connected to each other and through a line 130 to one terminal 132 of a variable inductance 134 which forms a portion of the tuned circuit of the oscillator 24. The oscillator circuit 24 has five separate ranges and, accordingly, five separate coils 134 having identical connections but different circuit values are provided. The center terminal 136 of coil 134 is connected through a line 138 to a resistor 140 (47 ohms) which is in turn connected to a resistance 142 (400 ohms) in series with an inductance 144. Inductance 144 is connected through a line 146, inductance 148 (14μh.) and an inductance 150 (14 μh.) to the arm 108 on which appears the regulated high potential power supply.

The other terminal 152 of coil 134 is connected through a line 154 to the plate of tube 112 and accordingly the plate of tube 112 receives D.C. potential through the coil 134. The plate of tube 112 is also connected to ground through a series of three parallel capacitors, namely a variable capacitor 156 (1.7–8.7 μμf.), a fixed capacitor 158 (10 μμf.) and another variable capacitor 160 (9.2–17.2 μμf.).

Capacitors 120, 121 and 160 are ganged together. The described circuit 24 is operable to produce a continually variable frequency over a given range, there being several different individual ranges. More particularly each coil 134 is adjustable to provide a continually varying frequency over a given specified range for the particular coil 134.

The output from the variable oscillator 24 is taken from the plate through a line 162 to the plate of a tube 164 in the reactor circuit 26. Tube 164 is preferably a 6AH6 pentode.

The cathode of tube 164 is heated by a filament 166 which is supplied with potential from the low voltage filament supply line 101. The third grid of the tube is connected directly to the cathode and the cathode is in turn connected to ground through a resistance 168

(100 ohms). Cathode bias is provided for tube 164 by providing resistance 168 with a by-pass capacitor 170 (800 $\mu\mu$f.).

The control grid of tube 164 is connected through a capacitor 172 (10 $\mu\mu$f.) to the plate of tube 164 and to the plate of tube 112 in the variable oscillator. The control grid of tube 164 is also connected to a suitable RL circuit generally designated by the numeral 174 which is in turn connected to a resistor 176 (470 ohms). Resistor 176 is connected to an inductance 178 (14 $\mu$h.) and an inductance 180 (14 $\mu$h.) to a kilocycle deviation meter when calibrating and to a source of AF modulating voltage when desired. One end of resistance 176 is connected to ground through a capacitance 182 (470 $\mu\mu$f.).

Instead of the RL circuit 174, an RL circuit 174A, a resistance 174B, a resistance 174C, and a RC circuit 174D are provided for use on difference frequency ranges. The various circuit elements 174–174D are ganged to the coils 134–134D so that these elements are automatically switched in both circuits when the frequency of oscillator frequency circuit 124 is changed.

The variable frequency oscillator 24 when constructed as described above has in the output thereof a significant content of the second harmonic of the fundamental frequency of the working signal which is useful in calibrating the working signal at certain points, as will be described more fully later. The reactor circuit 26 is also inherently nonlinear in character and serves to emphasize and to generate the second harmonic of the working signal fed thereto from the variable frequency oscillator 24.

The modulated or unmodulated output from the variable oscillator 24 is fed to a piece of electronic equipment to be tested by means of an output radio frequency attenuator generally designated by the numeral 191 in Fig. 1. The attenuator includes in general a pick-up coil 192, one end of which is grounded as at 194 and the other end 196 of which is connected to the electronic equipment to be tested. Coil 192 is inductively coupled to the coil 134 in the tank circuit 24. An electrostatic shield 198 is provided to prevent excitation of the pick-up loop or coil 192 by capacity coupling. The pick-up coil 192 is positioned within a metal tube 200 so that the tube and coil operate on the inductive-coupling mode as a wave guide below cutoff.

A pick-up loop or monitor wire 202 is provided, the monitor wire extending into the tube 200 and being positioned between the pick-up loop 192 and theelectrostatic shield 198. The position of monitor loop 202 is adjustable. A connection is made from the monitor loop 202 through a rectifier 204 ,a resistance 206, an inductance 208 and a second inductance 210 to a speaker. A capacitor 212 by-passes resistance 206 to ground.

Figure 3:
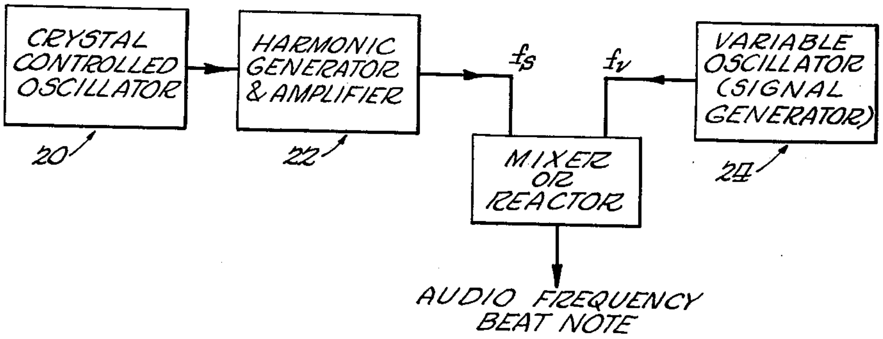
Fig. 3 is a block diagram illustrating the calibration system for calibrating the variable radio frequency oscillator by means of the calibration oscillator shown in Fig. 1.

Referring now to Figs. 3 to 6 of the drawings, the new improved calibration system of the present invention will be described in detail. In Fig. 3 a block diagram is utilized to illustrate the fact that the crystal controlled oscillator 20 has its output fed to a harmonic generator and amplifier 22 which produces a plurality of calibration signals $f_s$. In the example of Fig. 1 the fundamental frequency of the signals $f_s$ is two megacycles and there is a signal at each two megacycle interval up to and including a 28 megacycle signal. All harmonics of two megacycles above 28 megacycles are suppressed by the circuit elements 92 and 94 in Fig. 1. These figures are based on the assumption that the output of the variable oscillator 24 is to be confined in the range of from zero to 28 megacycles. The output voltage, $f_v$ of the variable oscillator 24 is therefore always at a frequency within the range of zero to 28 megacycles.

The two signals $f_s$ and $f_v$ are fed into the reactor 26 where they are beat against each other and the difference frequency, which is an audio frequency when $f_s$ and $f_v$ are nearly identical, appears as a beat note in earphones, on a deviation meter or in a loud speaker as desired. When no beat note is present or in other words when a calibration beat null is obtained, $f_v$ can be said to be calibrated by $f_s$.

Figure 4:
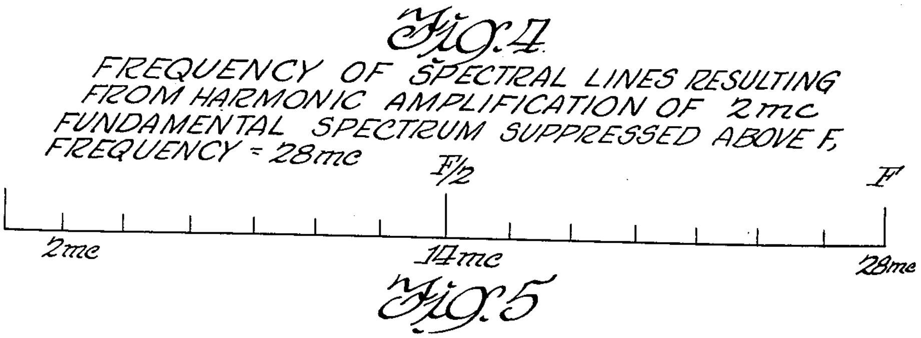
Fig. 4 is a chart showing the distribution of the frequencies of the spectral lines resulting from harmonic amplification of the fundamental frequency at which the calibration oscillator operates and illustrating the fact that the spectrum is suppressed above a frequency, F, which designates the upper limit of the range of operation of the variable radio frequency oscillator.

Fig. 4 illustrates the extent and disposition of the calibrating signals which are derived from the harmonic generator and amplifier 22. The frequency designated by the letter F represents the highest frequency which is to be obtained from variable oscillator 24 and in the illustrative example is equal to 28 megacycles. The signal $f_s$ has a component at each two megacycle interval beginning with a two megacycle signal up to and including a signal at 28 megacycles. All signals above 28 megacycles are suppressed.

The graph in Fig. 5 illustrates the points in the frequency spectrum from zero to 28 megacycles at which calibrating beat nulls are obtained when the output from generator 22, $f_s$, is beat against the output from the variable oscillator 24, $f_v$, in the mixer stage 26. It will be seen that a calibrating beat null is obtained at each one megacycle position from zero through 14 megacycles and that a calibrating beat null is obtained at two megacycle intervals beginning with a frequency equal to 14 megacycles. No beats appear above 28 megacycles.

The calibrating beat nulls at the even numbered megacycle position, that is at 2, 4, 6, 8 etc. megacycles are obtained in the normal manner by directly beating the fundamental of the frequency, $f_v$, against one of the calibrating signals $f_s$ illustrated in Fig. 4.

By referring to Fig. 6 the manner in which calibrating beat nulls are obtained at the odd numbered megacycle points, such as at one megacycle, 3 megacycles, etc. in the range from one megacycle to 13 megacycles will be explained. For example when the frequency $f_v$ equals 3 megacycles (the point indicated by the designation $f_{v1}$ in Fig. 6) the second harmonic of $f_{v1}$, i.e., a 6 megacycle signal, is beat against the 6 megacycle calibrating signal designated by the character $f_{s1}$ in Fig. 6. Thus by beating the second harmonic of the variable oscillator signal against a calibrating signal higher in the spectrum, calibrating beat nulls can be obtained at the odd megacycle positions. By way of further illustration, a signal $f_{v2}$ having a value of 9 megacycles which is generated by the variable oscillator 24 will produce a calibrating beat null by beating the second harmonic thereof of 18 megacycles against the calibrating signal $f_{s2}$ at 18 megacycles.

The above described method of obtained calibrating beat signals at the odd numbered megacycle positions is effective up to and including a signal at 13 megacycles. There is no calibrating beat signal at 15 megacycles or higher odd numbered megacycle positions since the calibrating signals $f_s$ are suppressed above the frequency, F, or 28 megacycles. If it is attempted to obtain a calibrating beat null at for example $f_{v3}$ equals 21 megacycles, no beat null would be achieved since the second harmonic of $f_{v3}$ is 42 megacycles and there is no calibrating signal $f_s$ at 42 megacycles against which to beat this second harmonic of the variable oscillator output. It will be seen therefore that there will be no calibrating beat nulls at the odd numbered megacycle positions above 14 megacycles.

The above calibrating arrangement has an important advantage since ordinary calibrating beat nulls are desirable at one megacycle intervals only at the low end of the spectrum. At the higher end of the spectrum it is actually a disadvantage to have calibrating signals at one megacycle intervals since the calibrating signals occur too frequently with a given change in setting of the dials controlling the output of the variable oscillator 24. In effect a spread in the calibrating signals is obtained in the upper half of the frequency spectrum from F/2 to F thus simplifying calibrating in this range and yet retaining one megacycle calibrating signals in the lower half of the range where there is a greater spread on the calibrating dials.

This application is a division of the copending application Serial No. 429,547, filed May 13, 1954 for Multi-Band Compensated Oscillator, now Patent No. 2,881,315 issued April 7, 1959.

It will be seen that there has been provided a signal generator fulfilling all of the advantages and objects set forth above. Although certain specific examples and values of the circuit elements have been given for purposes of illustration, it is to be understood that various changes can be made therein without departing from the spirit and scope of the invention. Accordingly, the invention is to be limited only as set forth in the following claims.

What is claimed is:

1. The method of calibrating the frequency of the working signal generated as the output from a variable frequency oscillator within a predetermined frequency range at first predetermined accurate frequencies equally spaced throughout the predetermined frequency range and at second predetermined accurate frequencies at the mid-points between the first predetermined frequencies only in the lower half of the predetermined frequency range, comprising generating a first signal having an accurate fundamental frequency corresponding to the interval between the first predetermined frequencies, generating harmonics of the first signal within the predetermined frequency range and suppressing all harmonics outside of the predetermined frequency range to provide a plurality of equally spaced calibrating signals at the first predetermined frequencies, operating the variable frequency oscillator to obtain as an output therefrom a working signal having a desired fundamental frequency within the predetermined frequency range and also to obtain the second harmonic of the working signal fundamental frequency, the working signal fundamental frequency during calibration being approximately the frequency of one of the first and second predetermined frequencies, beating the fundamental frequency of the working signal from the variable frequency oscillator against the calibrating signal having the frequency to which the working signal is to be adjusted when calibrating the variable frequency oscillator at one of the first predetermined frequencies and adjusting the frequency of the working signal until it produces a beat null with the appropriate calibrating signal, and beating the second harmonic of the working signal from the variable frequency oscillator against the calibrating signal having twice the frequency to which the working signal is to be adjusted when calibrating the variable frequency oscillator at one of the second predetermined frequencies and adjusting the frequency of the working signal until the second harmonic thereof produces a beat null with the appropriate calibrating signal.

2. The method of calibrating the frequency of the working signal generated as the output from a variable frequency oscillator within a predetermined frequency range at first predetermined accurate frequencies equally spaced at two megacycle intervals throughout the predetermined frequency range and at second predetermined accurate frequencies at the odd numbered megacycle intervals corresponding to the mid-points between the first predetermined frequency only in the lower half of the predetermined frequency range, comprising generating a first signal having an accurate fundamental frequency of two megacycles, generating harmonics of the first signal within the predetermined frequency range and suppressing all harmonics above the predetermined frequency range to provide a plurality of calibrating signals at two megacyle intervals, operating the variable frequency oscillator to obtain as one output therefrom having a desired fundamental frequency within the predetermined frequency range and also to obtain the second harmonic of the working signal fundamental frequency, the working signal fundamental frequency during calibrating being approximately the frequency of one of the first and second predetermined frequencies, beating the fundamental frequency of the working signal from the variable frequency oscillator against the calibrating signal having the frequency to which the working signal is to be adjusted when calibrating the variable frequency oscillator at one of the first predetermined frequencies and adjusting the frequency of the working signal until it produces a beat null with the appropriate calibrating signal, and beating the second harmonic of the working signal from the variable frequency oscillator against the calibrating signal having twice the frequency to which the working signal is to be adjusted when calibrating the variable frequency oscillator at one of the second predetermined frequencies and adjusting the frequency of the working signal until the second harmonic thereof produces a beat null with the appropriate calibrating signal.

3. In frequency calibrating apparatus for calibrating the frequency of the working signal generated as the output from a variable frequency oscillator within a predetermined frequency range at first predetermined accurate frequencies throughout the predetermined frequency range and at second predetermined accurate frequencies at the mid-points between the first predetermined frequencies only in the lower half of the predetermined frequency range, wherein the variable frequency oscillator is operable to provide as the output therefrom the working signal at a desired fundamental frequency and the second harmonic thereof, comprising a calibrating oscillator operable to produce a first signal having an accurately controlled fundamental frequency corresponding to the interval between the first predetermined frequencies, an harmonic generator and amplifier for generating harmonics of the first signal within the predetermined frequency range, means for suppressing all harmonics of the first signal outside of the predetermined frequency range to provide equally spaced calibrating signals throughout the predetermined frequency range, a mixer for beating the working signal and the second harmonic thereof from the variable frequency oscillator against the appropriate calibrating signal, said mixer beating the fundamental frequency of the working signal from the variable frequecy oscillator against the calibrating signal having the frequency to which the working signal is to be adjusted when calibrating the variable frequency oscillator at one of the first predetermined frequencies, said mixer beating the second harmonic of the working signal from the variable frequency oscillator against the calibrating signal having twice the frequency to which the working signal is to be adjusted when calibrating the variable frequency oscillator at one of the second predetermined frequencies, and means for detecting the beat null when the working signal and the second harmonic thereof are properly adjusted to and beat against the appropriate calibrating signal.

4. In frequency calibrating apparatus for calibrating the frequency of the working signal generated as the output from a variable frequency oscillator within a predetermined frequency range at first predetermined accurate frequencies spaced at two megacycle intervals throughout the predetermined frequency range and at second predetermined accurate frequencies at the mid-points between the first predetermined frequencies only in the lower half of the predetermined frequency range, wherein the variable frequency oscillator is operable to provide as the output therefrom a working signal at a desirable fundamental frequency and the said harmonic thereof, comprising an oscillator operable to produce a first signal having an accurate fundamental frequency of two megacycles, an harmonic generator and amplifier for generating harmonics of the first signal within the predetermined frequency range, means for suppressing all harmonics of the first signal above the predetermined frequencq range to provide calibrating signals at two megacycle intervals throughout the predetermined frequency range, a mixer for beating the working signal and the second harmonic thereof from the variable frequency oscillator against the appropriate calibrating signal, said mixer beating the fundamental frequency of the working signal from the variable frequency oscillator against the calibrating signal having the frequency to which the working signal is to be adjusted when calibrating the variable frequency oscillator at one of the first predetermined frequencies, said mixer beating the second harmonic of the working signal from the variable frequency oscillator against the calibrating signal having twice the frequency to which the working signal is to be adjusted when calibrating the variable frequency oscillator at one of the second predetermined frequencies, and means for detecting the beat null when the working signal and the second harmonic thereof are properly adjusted to and beat against the appropriate calibrating signal.

5. Apparatus for providing a calibrated working signal accurately calibrated within a predetermined frequency range at first predetermined accurate frequencies throughout the predetermined frequency range and at second predetermined accurate frequencies at the mid-points between the first predetermined frequencies only in the lower half of the predetermined frequency range, comprising a variable frequency oscillator operable to provide as the second output therefrom a working signal at a desirable fundamental frequency and the second harmonic thereof, a calibrating oscillator operable to produce a first signal having an accurate fundamental frequency corresponding to the interval between the first predetermined frequencies, an harmonic generator and amplifier for generating harmonics of the first signal within the predetermined frequency range, means for suppressing all harmonics of the first signal outside of the predetermined frequency range to provide equally spaced calibrating signals throughout the predetermined frequency range, a mixer for beating the working signal and the second harmonic thereof from the variable frequency oscillator against the appropriate calibrating signal, said mixer beating the fundamental frequency of the working signal from the variable frequency oscillator against the calibrating signals throughout the predetermined frequency ing signal is to be adjusted when calibrating the variable oscillator at one of the first predetermined frequencies, said mixer beating the second harmonic of the working signal from the variable frequency oscillator against the calibrating signal having twice the frequency to which the working signal is to be adjusted when calibrating the variable frequency oscillator at one of the second predetermined frequencies, and means for detecting the beat null when the working signal and the second harmonic thereof are properly adjusted to and beat against the appropriate calibrating signal.

6. Apparatus for providing a calibrating working signal accurately calibrated within a predetermined frequency range at first predetermined accurate frequencies accurately spaced at two megacycle intravals throughout the predetermined frequency range and at second predetermined accurate frequencies at the mid-points between the first predetermined frequencies only in the lower half of the predetermined frequency range, comprising a variable frequency oscillator operable to provide as the output therefrom a working signal at a desired fundamental frequency and the second harmonic thereof, a calibrating oscillator operable to produce a first signal having an accurately controlled fundamental frequency of two megacycles, an harmonic generator and amplifier for generating harmonics of the fundamental frequency of the first signal within the predetermined frequency range, means for suppressing all harmonics of the first signal outside of the predetermined frequency range to provide equally spaced calibrating signals at two megacycle intervals throughout the predetermined frequency range, a mixer for beating the working signal and the second harmonic thereof from the variable frequency oscillator against the appropriate calibrating signal, said mixer beating the fundamental frequency of the working signal from the variable frequency oscillator against the calibrating signal having the frequency to which the working signal is to be adjusted when calibrating the variable frequency oscillator at one of the first predetermined frequencies, said mixer beating the second harmonic of the working signal from the variable frequency oscillator against the calibrating signal having twice the frequency to which the working signal is to be adjusted when calibrating the variable frequency oscillator at one of the second predetermined frequencies, and means for detecting the beat null when the working signal and the second harmonic thereof are properly adjusted to and beat against the appropriate calibrating signal.

References Cited in the file of this patent

UNITED STATES PATENTS

| | | |
|---|---|---|
| 2,508,547 | Slonczewski | May 23, 1950 |
| 2,629,829 | Daly | Feb. 24, 1953 |
| 2,686,294 | Hower | Aug. 10, 1954 |
| 2,738,462 | Troxel | Mar. 13, 1956 |

UNITED STATES PATENT OFFICE

CERTIFICATION OF CORRECTION

Patent No. 2,976,494 March 21, 1961

Arthur H. Maciszewski et al.

It is hereby certified that error appears in the above numbered patent requiring correction and that the said Letters Patent should read as corrected below.

Column 1, line 25, for "huch" read -- such --; column 2, line 37, for "amplifiers" read -- amplifies --; column 5, line 49, for "theelectro-" read -- the electro- --; column 9, lines 42 and 43, for "signals throughout the predetermined frequency ing signal" read -- signal having the frequency to which the working signal --; column 10, line 8, for "intravals" read -- intervals --.

Signed and sealed this 5th day of September 1961.

(SEAL)
Attest:

ERNEST W. SWIDER
Attesting Officer

DAVID L. LADD
Commissioner of Patents